United States Patent
Xu et al.

(10) Patent No.: US 11,127,334 B2
(45) Date of Patent: Sep. 21, 2021

(54) DISPLAY DEVICE AND DISPLAY METHOD OF THE SAME

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Rui Xu, Beijing (CN); Chao Tian, Beijing (CN); Min Wang, Beijing (CN); Zhe Wang, Beijing (CN); Shuo Li, Beijing (CN); Xiang Yuan, Beijing (CN); Qingqing Ma, Beijing (CN); Yinan Gao, Beijing (CN); Guojie Qin, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/831,910

(22) Filed: Mar. 27, 2020

(65) Prior Publication Data

US 2021/0012697 A1 Jan. 14, 2021

(30) Foreign Application Priority Data

Jul. 10, 2019 (CN) .......................... 201910621653.4

(51) Int. Cl.
*G09G 3/20* (2006.01)
*G02F 1/1685* (2019.01)
(Continued)

(52) U.S. Cl.
CPC ........... *G09G 3/2003* (2013.01); *G02F 1/137* (2013.01); *G02F 1/167* (2013.01); *G02F 1/1685* (2019.01);
(Continued)

(58) Field of Classification Search
CPC .... G09G 3/2003; G09G 3/3611; G09G 3/344; G09G 2300/023; G09G 3/20;
(Continued)

(56) References Cited

U.S. PATENT DOCUMENTS 7,548,291 B2 * 6/2009 Lee .................. G02F 1/133514
349/106
7,791,691 B2 * 9/2010 Lee .................. G02F 1/133514
349/106

(Continued)

FOREIGN PATENT DOCUMENTS

CN          1617033 A       5/2005
CN         201740953 U      2/2011

(Continued)

OTHER PUBLICATIONS

First Office Action for Chinese Application No. 201910621653.4, dated Jun. 11, 2020, 8 Pages.

(Continued)

*Primary Examiner* — Jeff Piziali
(74) *Attorney, Agent, or Firm* — Brooks Kushman P.C.

(57) ABSTRACT

A display device and a display method of the same are provided. The display device includes: a color electrophoretic display pixel layer and a liquid crystal layer; the color electrophoretic display pixel layer includes electrophoretic display pixel units arranged in an array, each of the electrophoretic display pixel units includes three pixel sub-units, and each of the electrophoretic display pixel units is configured to display a color by mixing colors of the three pixel (Continued)

sub-units; the liquid crystal layer is disposed on a light-emitting surface of the color electrophoretic display pixel layer, and a luminous flux of light emitted from the color electrophoretic display pixel layer is changed by controlling a deflection angle of a liquid crystal in the liquid crystal layer.

12 Claims, 4 Drawing Sheets

(51) Int. Cl.
    *G02F 1/137*     (2006.01)
    *G02F 1/167*     (2019.01)
    *G09G 3/34*     (2006.01)
    *G09G 3/36*     (2006.01)
(52) U.S. Cl.
    CPC ........... *G09G 3/344* (2013.01); *G09G 3/3611* (2013.01); *G02F 2201/44* (2013.01); *G09G 2300/023* (2013.01)
(58) Field of Classification Search
    CPC ........ G02F 1/137; G02F 1/167; G02F 1/1685; G02F 2201/44
    See application file for complete search history.

(56) References Cited

U.S. PATENT DOCUMENTS

| 8,072,674 | B2* | 12/2011 | Wang | G02F 1/167 |
| | | | | 359/296 |
| 2005/0099559 | A1* | 5/2005 | Lee | G02F 1/167 |
| | | | | 349/113 |
| 2010/0003883 | A1* | 1/2010 | Lee | G02F 1/133514 |
| | | | | 445/24 |
| 2010/0134871 | A1* | 6/2010 | Wang | G02F 1/1677 |
| | | | | 359/296 |
| 2012/0032992 | A1 | 2/2012 | Lim et al. | |
| 2016/0111050 | A1* | 4/2016 | Pyun | G09G 3/3688 |
| | | | | 345/694 |

FOREIGN PATENT DOCUMENTS

| CN | 102193224 A | 9/2011 |
| CN | 108037625 A | 5/2018 |

OTHER PUBLICATIONS

Second Office Action for Chinese Application No. 201910621653.4, dated Nov. 26, 2020, 8 Pages.

* cited by examiner

DISPLAY DEVICE AND DISPLAY METHOD OF THE SAME

CROSS-REFERENCE TO RELATED APPLICATION

This application claims priority to Chinese Patent Application No. 201910621653.4 filed on Jul. 10, 2019, which is incorporated herein by reference in its entirety.

TECHNICAL FIELD

The present disclosure relates to the field of display technologies, in particular to a display device and a display method of the same.

BACKGROUND

In an era of an Internet of Everything, a development direction of various electronic device carriers carrying an Internet of Things is low power consumption and renewable. Technologies such as electrophoretic display or cholesteric liquid crystal display strive to achieve a steady state of material to ensure that a display does not need to be constantly driven. At present, a mass-produced bistable product is mainly an electrophoretic ink. An advantage of the ink is that a steady state of an ink particle is maintained for a long time even during being powered off, thereby ensuring a normal display of an image. Therefore, a device relying on the electrophoretic ink material to display is an important carrier for low-power display at present.

However, the electrophoretic ink particle relies on a positive or negative electrical property of the particle to drive the ink particle up or down to an electrode surface. When colors are required to be displayed, the more kinds of colors are displayed, the longer it takes to separate particles of a same electrical property and different colors. Thus image refresh time is increased greatly, which affects a user experience. The more kinds of colors of the ink particles of a same electrical property are, the more prone to a color mixing problem it is. Moreover, it takes longer to achieve a grayscale in an electrophoretic display.

SUMMARY

According to a first aspect of the present application, a display device is provided in an embodiment of the present disclosure, including: a color electrophoretic display pixel layer and a liquid crystal layer; where the color electrophoretic display pixel layer includes electrophoretic display pixel units arranged in an array, each of the electrophoretic display pixel units includes three pixel sub-units, and each of the electrophoretic display pixel units is configured to display a color by mixing colors of the three pixel sub-units;

the liquid crystal layer is disposed on a light-emitting surface of the color electrophoretic display pixel layer, and a luminous flux of light emitted from the color electrophoretic display pixel layer is changed by controlling a deflection angle of a liquid crystal in the liquid crystal layer.

According to a second aspect of the present application, a display method of a display device is provided in an embodiment of the present disclosure, including:

determining a first electric field control signal of a liquid crystal layer and a second electric field control signal of a color electrophoretic display pixel layer according to a display pattern;

controlling a deflection angle of a liquid crystal in the liquid crystal layer in response to the first electric field control signal to change a luminous flux of light emitted from the color electrophoretic display pixel layer; and controlling each of electrophoretic display pixel units of the color electrophoretic display pixel layer to display a color by mixing colors of three pixel sub-units of each of the electrophoretic display pixel units in response to the second electric field control signal.

DETAILED DESCRIPTION

In order to make an objective, a technical solution and an advantage of the embodiments of the present disclosure clearer, a detailed description will be given below with reference to the accompanying drawings and the embodiments of the present disclosure. It should be appreciated that, in case of no conflict, the embodiments in the present application and the features in the embodiments may be arbitrarily combined with each other.

Figure 1A:
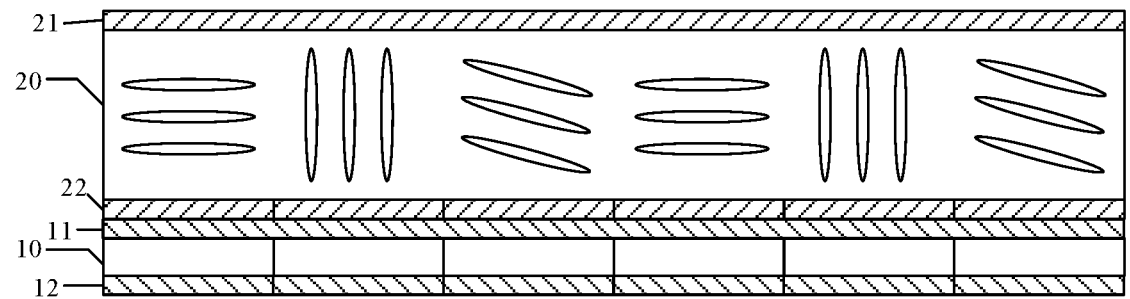
FIG. 1a shows a display device in some embodiments of the present disclosure.

As shown in FIG. 1a, a display device is provided in some embodiments of the present disclosure, including: a color electrophoretic display (EPD) pixel layer 10 and a liquid crystal layer 20; the color EPD pixel layer includes EPD pixel units arranged in an array, each of the EPD pixel units includes three pixel sub-units, and each of the EPD pixel units displays a color by mixing colors of the three pixel sub-units; the liquid crystal layer is disposed on a light-emitting surface of the color EPD pixel layer, and a luminous flux of light emitted from the color EPD pixel layer is changed by controlling a deflection angle of a liquid crystal in the liquid crystal layer.

In some embodiments of the present disclosure, the display device may be an electrophoretic display device realizing multi-grayscale color.

In some embodiments of the present disclosure, the display device further includes a control circuit, the control circuit is electrically connected to a first electrode and a second electrode of the liquid crystal layer, and configured to provide a first electric field control signal for controlling the deflection angle of the liquid crystal.

In some embodiments of the present disclosure, the control circuit is electrically connected to a third electrode and a fourth electrode of the color electrophoretic display pixel layer, and configured to provide a second electric field control signal for controlling each of the electrophoretic display pixel units of the color electrophoretic display pixel layer to display the color by mixing the colors of the three pixel sub-units.

In some embodiments of the present disclosure, 21 in FIG. 1*a* denotes the first electrode, and 22 in FIG. 1*a* denotes the second electrode. The first electrode may be a surface electrode, and the second electrode is electrodes corresponding to each liquid crystal sub-unit to achieve an independent control of the deflection angle of each liquid crystal sub-unit.

In some embodiments of the present disclosure, 11 in FIG. 1*a* denotes the third electrode of the color electrophoretic display pixel layer, and the third electrode is a surface electrode. 12 in FIG. 1*a* denotes the fourth electrode, and the fourth electrode is display control electrodes in one-to-one correspondence with the pixel sub-units, i.e., a first display control electrode, a second display control electrode and a third display control electrode, to achieve an independent control of each pixel sub-unit.

Figure 1B:
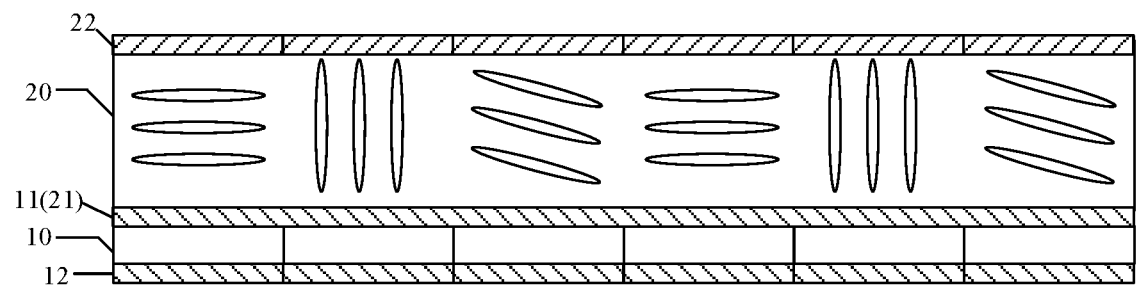
FIG. 1b shows a display device in some embodiments of the present disclosure.

In some embodiments of the present disclosure, the third electrode is a first common electrode of each pixel sub-unit, and the third electrode may be multiplexed by each liquid crystal sub-unit and each pixel sub-unit, as shown in FIG. 1*b*.

In some embodiments of the present disclosure, the EPD pixel unit includes a first pixel sub-unit, a second pixel sub-unit and a third pixel sub-unit.

In some embodiments of the present disclosure, the first pixel sub-unit is configured to display a first color or a background color, the second pixel sub-unit is configured to display a second color or the background color, and the third pixel sub-unit is configured to display a third color or the background color.

In some embodiments of the present disclosure, the first pixel sub-unit includes a first micro-cup, a first display control electrode and a first common electrode; the first micro-cup carries a background color charged particle, a first color charged particle and an electrophoretic liquid, and an electrical property of the background color charged particle is opposite to an electrical property of the first color charged particle, the background color charged particle and the first color charged particle are respectively gathered to a top or a bottom of the first micro-cup under an action of a first electric field formed by the first display control electrode and the first common electrode; the second pixel sub-unit includes a second micro-cup, a second display control electrode and the first common electrode; the second micro-cup carries the background color charged particle, a second color charged particle and the electrophoretic liquid, and an electrical property of the second color charged particle is opposite to the electrical property of the background color charged particle, the background color charged particle and the second color charged particle are respectively gathered to a top or a bottom of the second micro-cup under an action of a second electric field formed by the second display control electrode and the first common electrode; and the third pixel sub-unit includes a third micro-cup, a third display control electrode and the first common electrode; the third micro-cup carries the background color charged particle, a third color charged particle and the electrophoretic liquid, and an electrical property of the third color charged particle is opposite to the electrical property of the background color charged particle, the background color charged particle and the third color charged particle are respectively gathered to a top or a bottom of the third micro-cup under an action of a third electric field formed by the third display control electrode and the first common electrode.

In some embodiments of the present disclosure, the first color is cyan, the second color is yellow, the third color is magenta, and the background color is white. Then the first pixel sub-unit displays white W or cyan C, the second pixel sub-unit displays white W or yellow W, and the third pixel sub-unit displays white W or magenta M.

Figure 2:
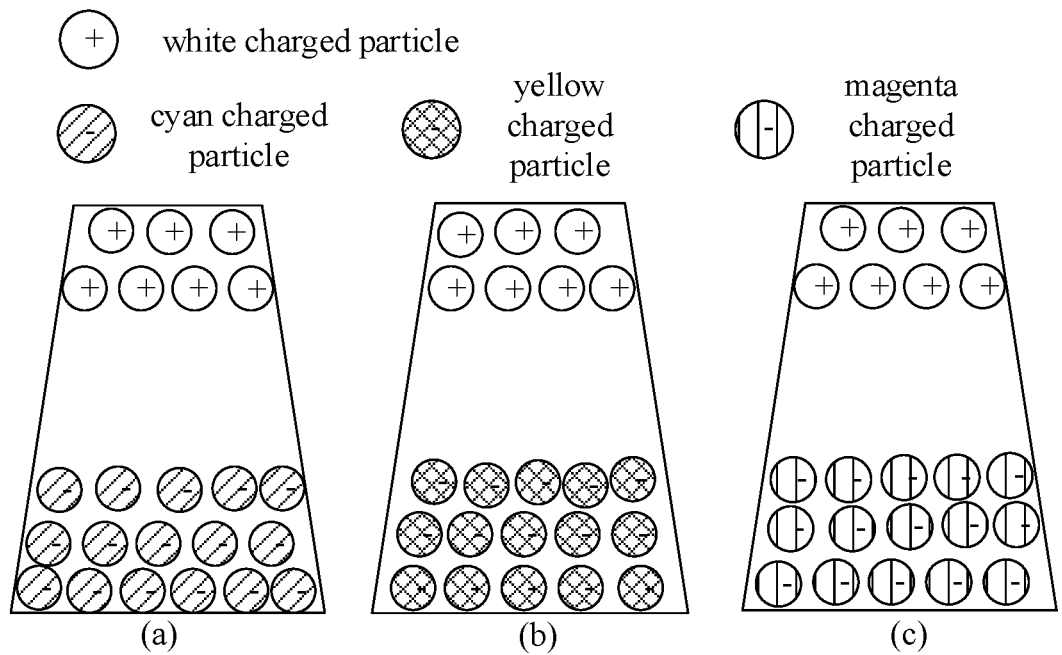
FIG. 2 is a schematic diagram of micro-cups of three pixel sub-units in a CYM color mixing mode in some embodiments of the present disclosure.

In some embodiments of the present disclosure, as shown in FIG. 2, each EPD pixel unit includes three micro-cups. In some embodiments of the present disclosure, the micro-cup may be a container of any shape, such as trapezoid, hexagon, and circle. A first micro-cup carries a white W charged particle and a cyan C charged particle, a second micro-cup carries the white W charged particle and a yellow Y charged particle, and a third micro-cup carries the white W charged particle and a magenta M charged particle.

The white W charged particle does not absorb light of any wavelength and displays white; the cyan C charged particle absorbs light in a red R spectrum and displays cyan C; the yellow Y charged particle absorbs light in a blue B spectrum and displays yellow Y; the magenta M charged particle absorbs light in a green G spectrum and displays magenta M.

As shown in FIG. 2(*a*), the first pixel sub-unit includes the first micro-cup, a first display control electrode and a first common electrode; the first micro-cup carries the white W charged particle, the cyan C charged particle and an electrophoretic liquid, and an electrical property of the white W charged particle is opposite to an electrical property of the cyan C charged particle, the white W charged particle and the cyan C charged particle are respectively gathered to a top or a bottom of the first micro-cup under an action of a first electric field formed by the first display control electrode and the first common electrode.

The white W charged particle is gathered to the top of the first micro-cup and the cyan C charged particle is gathered to the bottom of the first micro-cup when the first electric field is in a first direction, the first pixel sub-unit to display white W; the white W charged particle is gathered to the bottom of the first micro-cup and the cyan C charged particle is gathered to the top of the first micro-cup when the first electric field is in a second direction, the first pixel sub-unit to display the cyan C; the first direction is opposite to the second direction.

As shown in FIG. 2(*b*), the second pixel sub-unit includes the second micro-cup, a second display control electrode and the first common electrode; the second micro-cup carries the white W charged particle, the yellow Y charged particle and the electrophoretic liquid, and an electrical property of the yellow Y charged particle is opposite to the electrical property of the white W charged particle, the white W charged particle and the yellow Y charged particle are respectively gathered to a top or a bottom of the second micro-cup under an action of a second electric field formed by the second display control electrode and the first common electrode.

The white W charged particle is gathered to the top of the second micro-cup and the yellow Y charged particle is gathered to the bottom of the second micro-cup when the second electric field is in the first direction, the second pixel sub-unit to display white W; and the white W charged particle is gathered to the bottom of the second micro-cup and the yellow Y charged particle is gathered to the top of the second micro-cup when the second electric field is in the second direction, the second pixel sub-unit to display yellow Y; the first direction is opposite to the second direction.

As shown in FIG. 2(c), the third pixel sub-unit includes the third micro-cup, a third display control electrode and the first common electrode; the third micro-cup carries the white W charged particle, the magenta M charged particle and the electrophoretic liquid, and an electrical property of the magenta M charged particle is opposite to the electrical property of the white W charged particle, the white W charged particle and the magenta M charged particle are respectively gathered to a top or a bottom of the third micro-cup under an action of a third electric field formed by the third display control electrode and the first common electrode.

The white W charged particle is gathered to the top of the third micro-cup and the magenta M charged particle is gathered to the bottom of the third micro-cup when the third electric field is in the first direction, the third pixel sub-unit to display white W; and the white W charged particle is gathered to the bottom of the third micro-cup and the magenta M charged particle is gathered to the top of the third micro-cup when the third electric field is in the second direction, the third pixel sub-unit to display magenta M; the first direction is opposite to the second direction.

In some embodiments of the present disclosure, the liquid crystal layer includes liquid crystal units arranged in an array, and the liquid crystal units are in one-to-one correspondence with the EPD pixel units; each of the liquid crystal units includes a first liquid crystal sub-unit, a second liquid crystal sub-unit and a third liquid crystal sub-unit; the first liquid crystal sub-unit is disposed on the first pixel sub-unit to change a luminous flux of light emitted from the first pixel sub-unit; the second liquid crystal sub-unit is disposed on the second pixel sub-unit to change a luminous flux of light emitted from the second pixel sub-unit; and the third liquid crystal sub-unit is disposed on the third pixel sub-unit to change a luminous flux of light emitted from the third pixel sub-unit.

Figure 3:
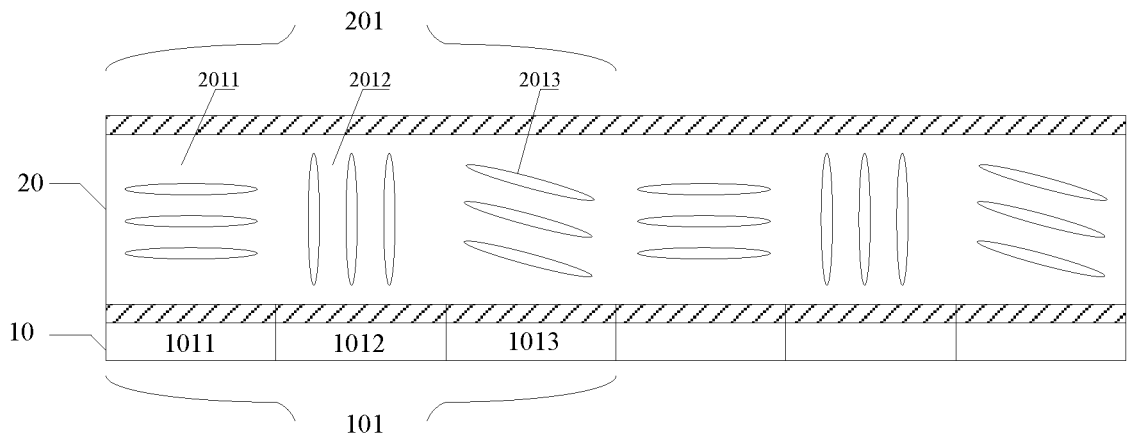
FIG. 3 is a schematic diagram illustrating pixel sub-units of a color EPD layer being in one-to-one correspondence with liquid crystal sub-units of a liquid crystal layer in some embodiments of the present disclosure.

As shown in FIG. 3, the liquid crystal layer 20 includes liquid crystal units 201 arranged in an array, and one liquid crystal unit 201 corresponds to one EPD pixel unit 101; one liquid crystal unit includes three liquid crystal sub-units (2011, 2012, 2013); the color EPD pixel layer 10 includes EPD pixel units 101 arranged in an array, one EPD pixel unit includes three pixel sub-units (1011, 1012, 1013), three liquid crystal sub-units are in one-to-one correspondence with three pixel sub-units, i.e., the first liquid crystal sub-unit 2011 is configured to change a luminous flux of light emitted from the first pixel sub-unit 1011; the second liquid crystal sub-unit 2012 is configured to change a luminous flux of light emitted from the second pixel sub-unit 1012; and the third liquid crystal sub-unit 2013 is configured to change a luminous flux of light emitted from the third pixel sub-unit 1013.

In some embodiments of the present disclosure, the luminous flux of the light emitted from the color EPD pixel layer changed by the liquid crystal layer is divided into N levels; That is, a transmission degree of the liquid crystal layer to the light may be divided into a total of N levels from fully transparent to fully opaque, N is larger than or equal to 256.

Figure 4:
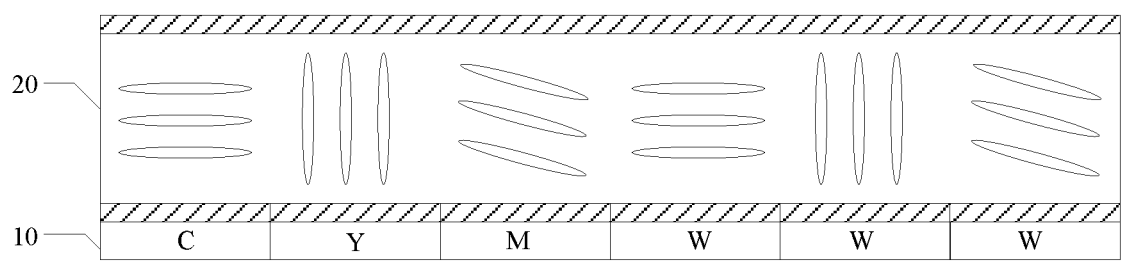
FIG. 4 is a schematic diagram of pixel sub-units of a color EPD layer and liquid crystal sub-units of a liquid crystal layer in a CYM color mixing mode cooperating to display in some embodiments of the present disclosure.

As shown in FIG. 4, each pixel sub-unit in a first EPD pixel unit displays one of three primary colors. That is, when the cyan C charged particle of the first pixel sub-unit, the yellow Y charged particle of the second pixel sub-unit and the magenta M charged particle of the third sub-pixel unit are all gathered to tops of the micro-cups under actions of electric fields, the first liquid crystal unit controls the luminous flux of the light emitted from the first pixel sub-unit by using the first liquid crystal sub-unit, the second liquid crystal sub-unit controls the luminous flux of the light emitted from the second pixel sub-unit; and the third liquid crystal sub-unit controls the luminous flux of the light emitted from the third pixel sub-unit. Thus, mixing of the three primary colors (cyan C, yellow Y and magenta M) is realized, thereby displaying multi-grayscale (256 or more) color.

As shown in FIG. 4, each pixel sub-unit in a second EPD pixel unit displays white, that is, the white W charged particle of the first pixel sub-unit, the white W charged particle of the second pixel sub-unit and the white W charged particle of the third sub-pixel unit are all gathered to the tops of the micro-cups under the actions of electric fields. Each of the three liquid crystal sub-units of the second liquid crystal unit controls the luminous flux of the light emitted from the corresponding pixel sub-unit to realize the grayscale.

When the luminous fluxes of the light emitted from the first pixel sub-unit, the second pixel sub-unit and the third pixel sub-unit are identical, cyan C, yellow Y and magenta M may be mixed to obtain black.

In some embodiments of the present disclosure, when the liquid crystal layer is not powered and is in a fully transparent state, the Y, C, and M charged particles in the three micro-cups of the EPD pixel unit are all on the tops of the micro-cups, the EPD pixel unit displays black, then the grayscale may be realized by controlling the deflection angle of the liquid crystal. When the white charged particles in the three micro-cups of the EPD pixel unit are all on the tops of the micro-cups, the EPD pixel unit displays white, then the grayscale may be realized by controlling the deflection angle of the liquid crystal.

When the liquid crystal layer is not turned on, three primary colors (cyan C, yellow Y and magenta M), white, red, green, blue and black may be displayed on the electrophoretic display device. Because a steady state of the charged particles in the EPD pixel unit may also be maintained even during being powered off, the electrophoretic display device may guarantee an image quality even when power is off. When the liquid crystal layer is turned on, the electrophoretic display device displays full-grayscale colors, and a response speed of the liquid crystal is high, thereby well realizing switching color images.

In some embodiments of the present disclosure, the first color is red, the second color is green, the third color is blue, and the background color is black. Then the first pixel sub-unit displays black K or red R, the second pixel sub-unit displays black K or green G, and the third pixel sub-unit displays black K or blue B.

Figure 5:
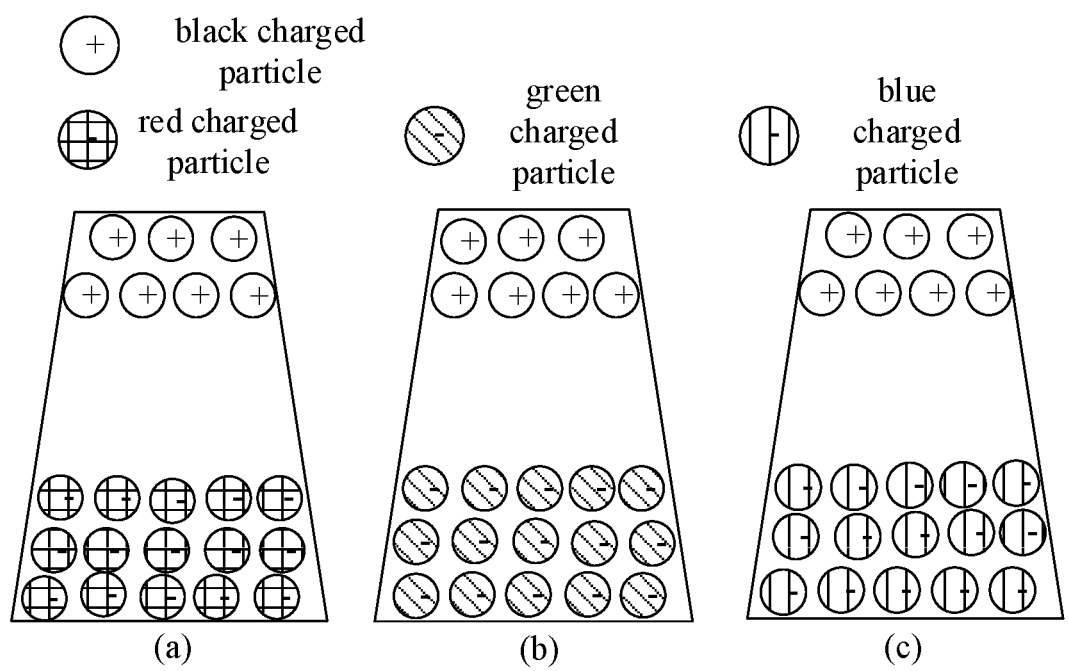
FIG. 5 is a schematic diagram of micro-cups of three pixel sub-units in a RGB color mixing mode in some embodiments of the present disclosure.

In some embodiments of the present disclosure, as shown in FIG. 5, each EPD pixel unit includes three micro-cups. In some embodiments of the present disclosure, the micro-cup may be a container of any shape, such as trapezoid, hexagon, and circle. A first micro-cup carries a black K charged particle and a red R charged particle, a second micro-cup carries the black K charged particle and a green G charged particle, and a third micro-cup carries the black K charged particle and a blue B charged particle.

The black K charged particle absorbs light of all wavelengths and displays black; the red R charged particle reflects light in a red R spectrum and displays red; the green G charged particle reflects light in a green G spectrum and displays green; the blue B charged particle reflects light in a blue B spectrum and displays blue.

As shown in FIG. 5(a), the first pixel sub-unit includes the first micro-cup, a first display control electrode and a first common electrode; the first micro-cup carries the black K charged particle, the red R charged particle and an electrophoretic liquid, and an electrical property of the black K charged particle is opposite to an electrical property of the red R charged particle, the black K charged particle and the red R charged particle are respectively gathered to a top or a bottom of the first micro-cup under an action of a first electric field formed by the first display control electrode and the first common electrode.

The black charged particle is gathered to the top of the first micro-cup and the red charged particle is gathered to the bottom of the first micro-cup when the first electric field is in a first direction, the first pixel sub-unit to display black; the black charged particle is gathered to the bottom of the first micro-cup and the red charged particle is gathered to the top of the first micro-cup when the first electric field is in a second direction, the first pixel sub-unit to display red; the first direction is opposite to the second direction.

As shown in FIG. 5(b), the second pixel sub-unit includes the second micro-cup, a second display control electrode and the first common electrode; the second micro-cup carries the black K charged particle, the green G charged particle and the electrophoretic liquid, and an electrical property of the green charged particle is opposite to the electrical property of the black charged particle, the black charged particle and the green charged particle are respectively gathered to a top or a bottom of the second micro-cup under an action of a second electric field formed by the second display control electrode and the first common electrode.

The black charged particle is gathered to the top of the second micro-cup and the green charged particle is gathered to the bottom of the second micro-cup when the second electric field is in the first direction, the second pixel sub-unit to display black; and the black charged particle is gathered to the bottom of the second micro-cup and the green charged particle is gathered to the top of the second micro-cup when the second electric field is in the second direction, the second pixel sub-unit to display green; the first direction is opposite to the second direction.

As shown in FIG. 5(c), the third pixel sub-unit includes the third micro-cup, a third display control electrode and the first common electrode; the third micro-cup carries the black K charged particle, the blue B charged particle and the electrophoretic liquid, and an electrical property of the blue charged particle is opposite to the electrical property of the black charged particle, the black charged particle and the blue charged particle are respectively gathered to a top or a bottom of the third micro-cup under an action of a third electric field formed by the third display control electrode and the first common electrode.

The black charged particle is gathered to the top of the third micro-cup and the blue charged particle is gathered to the bottom of the third micro-cup when the third electric field is in the first direction, the third pixel sub-unit to display black; and the black charged particle is gathered to the bottom of the third micro-cup and the blue charged particle is gathered to the top of the third micro-cup when the third electric field is in the second direction, the third pixel sub-unit to display blue; the first direction is opposite to the second direction.

Figure 6:
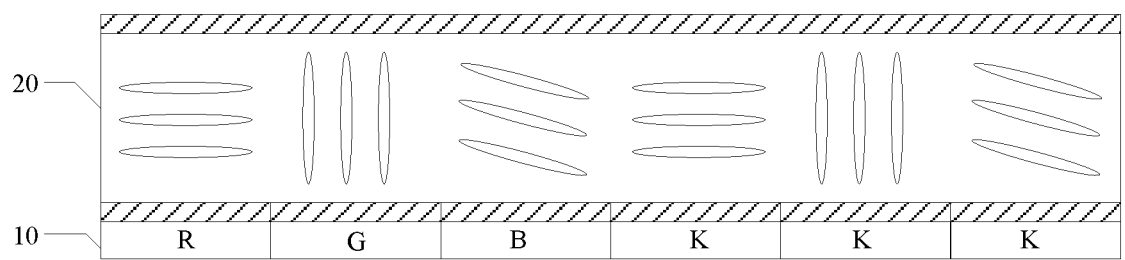
FIG. 6 is a schematic diagram of pixel sub-units of a color EPD layer and liquid crystal sub-units of a liquid crystal layer in a RGB color mixing mode cooperating to display in some embodiments of the present disclosure.

As shown in FIG. 6, each pixel sub-unit in a first EPD pixel unit displays one of three primary colors. That is, when the red R charged particle of the first pixel sub-unit, the green G charged particle of the second pixel sub-unit and the blue B charged particle of the third sub-pixel unit are all gathered to tops of the micro-cups under actions of electric fields, the first liquid crystal unit controls the luminous flux of the light emitted from the first pixel sub-unit by using the first liquid crystal sub-unit, the second liquid crystal sub-unit controls the luminous flux of the light emitted from the second pixel sub-unit; and the third liquid crystal sub-unit controls the luminous flux of the light emitted from the third pixel sub-unit. Thus, mixing of the three primary colors (red R, green G and blue B) is realized, thereby displaying multi-grayscale (256 or more) color.

As shown in FIG. 6, each pixel sub-unit in a second EPD pixel unit displays black, that is, the black K charged particle of the first pixel sub-unit, the black K charged particle of the second pixel sub-unit and the black K charged particle of the third sub-pixel unit are all gathered to the tops of the micro-cups under the actions of electric fields. Each of the three liquid crystal sub-units of the second liquid crystal unit controls the luminous flux of the light emitted from the corresponding pixel sub-unit to realize the grayscale.

When the luminous fluxes of the light emitted from the first pixel sub-unit, the second pixel sub-unit and the third pixel sub-unit are identical, red R, green G and blue B may be mixed to obtain white.

In some embodiments of the present disclosure, when the liquid crystal layer is not powered and is in a fully transparent state, the R, G, and B charged particles in the three micro-cups of the EPD pixel unit are all on the tops of the micro-cups, the EPD pixel unit displays white, then the grayscale may be realized by controlling the deflection angle of the liquid crystal. When the black charged particles in the three micro-cups of the EPD pixel unit are all on the tops of the micro-cups, the EPD pixel unit displays black, then the grayscale may be realized by controlling the deflection angle of the liquid crystal.

When the liquid crystal layer is not turned on, three primary colors (red R, green G and blue B), black, yellow, cyan, magenta and white may be displayed on the electrophoretic display device. Because a steady state of the charged particles in the EPD pixel unit may also be maintained even during being powered off, the electrophoretic display device may guarantee an image quality even when power is off. When the liquid crystal layer is turned on, the electrophoretic display device displays full-grayscale colors, and a response speed of the liquid crystal is high, thereby well realizing switching color images.

Figure 7:
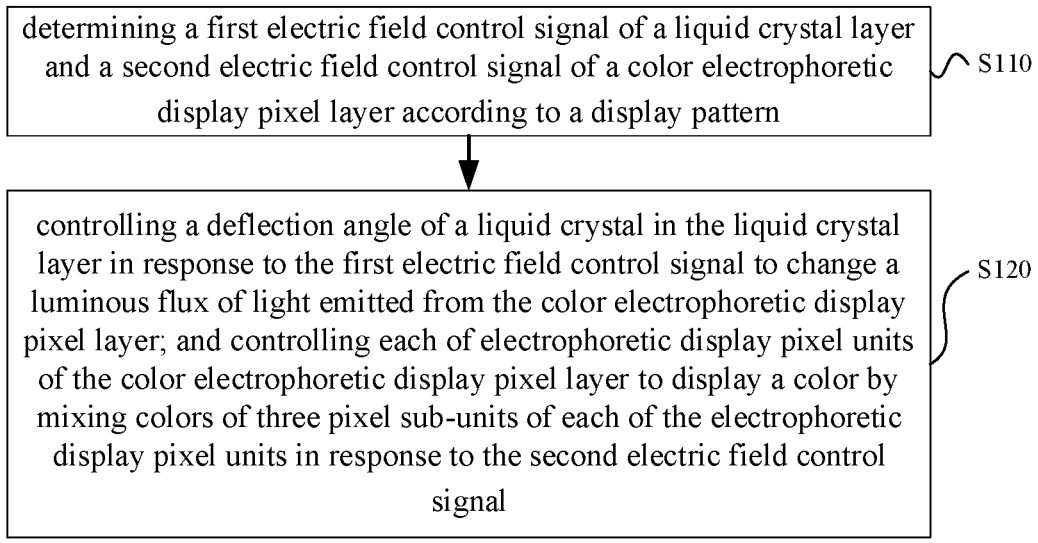
FIG. 7 is a flowchart of a display method of a display device in some embodiments of the present disclosure.

As shown in FIG. 7, a display method of a display device is provided in some embodiments of the present disclosure, including the following steps.

Step S110, determining a first electric field control signal of a liquid crystal layer and a second electric field control signal of a color electrophoretic display pixel layer according to a display pattern.

Step S120, controlling a deflection angle of a liquid crystal in the liquid crystal layer in response to the first electric field control signal to change a luminous flux of light emitted from the color electrophoretic display pixel layer; and controlling each of electrophoretic display pixel units of the color electrophoretic display pixel layer to display a color by mixing colors of three pixel sub-units of each of the electrophoretic display pixel units in response to the second electric field control signal.

In some embodiments of the present disclosure, the liquid crystal layer includes liquid crystal units arranged in an array, and the liquid crystal units are in one-to-one correspondence with the electrophoretic display pixel units; and each of the liquid crystal units includes three liquid crystal sub-units, and each of the three liquid crystal sub-units is correspondingly disposed on one of the pixel sub-units; the controlling the deflection angle of the liquid crystal in the liquid crystal layer in response to the first electric field control signal to change the luminous flux of light emitted from the color electrophoretic display pixel layer includes: controlling an electric field of each of the three liquid crystal sub-units in response to the first electric field control signal to change a luminous flux of light emitted from the pixel sub-unit corresponding to the liquid crystal sub-unit.

In some embodiments of the present disclosure, the electrophoretic display pixel unit includes a first pixel sub-unit, a second pixel sub-unit and a third pixel sub-unit; the first pixel sub-unit is configured to display a first color or a background color; the second pixel sub-unit is configured to display a second color or the background color; and the third pixel sub-unit is configured to display a third color or the background color.

In some embodiments of the present disclosure, the first pixel sub-unit includes a first micro-cup, a first display control electrode and a first common electrode; the first micro-cup carries a background color charged particle, a first color charged particle and an electrophoretic liquid, and an electrical property of the background color charged particle is opposite to an electrical property of the first color charged particle; the second pixel sub-unit includes a second micro-cup, a second display control electrode and the first common electrode; the second micro-cup carries the background color charged particle, a second color charged particle and the electrophoretic liquid, and an electrical property of the second color charged particle is opposite to the electrical property of the background color charged particle; and the third pixel sub-unit includes a third micro-cup, a third display control electrode and the first common electrode; the third micro-cup carries the background color charged particle, a third color charged particle and the electrophoretic liquid, and an electrical property of the third color charged particle is opposite to the electrical property of the background color charged particle.

In some embodiments of the present disclosure, the controlling each of electrophoretic display pixel units of the color electrophoretic display pixel layer to display the color by mixing the colors of three pixel sub-units of each of the electrophoretic display pixel units in response to the second electric field control signal includes: controlling a direction of a first electric field corresponding to the first pixel sub-unit to enable the first pixel sub-unit to display the background color in response to that the background color charged particle is gathered to a top of the first micro-cup and the first color charged particle is gathered to a bottom of the first micro-cup when the first electric field is in a first direction; and to enable the first pixel sub-unit to display the first color in response to that the background color charged particle is gathered to the bottom of the first micro-cup and the first color charged particle is gathered to the top of the first micro-cup when the first electric field is in a second direction; the first direction is opposite to the second direction; controlling a direction of a second electric field corresponding to the second pixel sub-unit to enable the second pixel sub-unit to display the background color in response to that the background color charged particle is gathered to a top of the second micro-cup and the second color charged particle is gathered to a bottom of the second micro-cup when the second electric field is in the first direction; and to enable the second pixel sub-unit to display the second color in response to that the background color charged particle is gathered to the bottom of the second micro-cup and the second color charged particle is gathered to the top of the second micro-cup when the second electric field is in the second direction; the first direction is opposite to the second direction; and controlling a direction of a third electric field corresponding to the third pixel sub-unit to enable the third pixel sub-unit to display the background color in response to that the background color charged particle is gathered to a top of the third micro-cup and the third color charged particle is gathered to a bottom of the third micro-cup when the third electric field is in the first direction; and to enable the third pixel sub-unit to display the third color in response to that the background color charged particle is gathered to the bottom of the third micro-cup and the third color charged particle is gathered to the top of the third micro-cup when the third electric field is in the second direction; the first direction is opposite to the second direction.

In some embodiments of the present disclosure, the first color is cyan, the second color is yellow, the third color is magenta, and the background color is white.

In some embodiments of the present disclosure, the first color is red, the second color is green, the third color is blue, and the background color is black.

It should be appreciated that there may be many other embodiments in the present disclosure, those of ordinary skill in the art may make various modifications and replacements without departing from the principle of the present disclosure, and these modifications and replacements shall also fall within the scope of the claims appended to the present disclosure.

What is claimed is:

1. A display device, comprising: a color electrophoretic display pixel layer and a liquid crystal layer, wherein,
   the color electrophoretic display pixel layer comprises electrophoretic display pixel units arranged in an array, each of the electrophoretic display pixel units comprises three pixel sub-units, and each of the electrophoretic display pixel units is configured to display a color by mixing colors of the three pixel sub-units;
   the liquid crystal layer is disposed on a light-emitting surface of the color electrophoretic display pixel layer, to change a luminous flux of light emitted from the color electrophoretic display pixel layer by controlling a deflection angle of a liquid crystal in the liquid crystal layer;
   wherein each of the electrophoretic display pixel units comprises a first pixel sub-unit, a second pixel sub-unit and a third pixel sub-unit; and
   the first pixel sub-unit is configured to display a first color or a background color, the second pixel sub-unit is configured to display a second color or the background color, and the third pixel sub-unit is configured to display a third color or the background color;
   the first pixel sub-unit comprises a first micro-cup, a first display control electrode and a first common electrode; the second pixel sub-unit comprises a second micro-cup, a second display control electrode and the first common electrode; and the third pixel sub-unit comprises a third micro-cup, a third display control electrode and the first common electrode;
   the display device further comprises a control circuit, wherein
   the control circuit is electrically connected to a first electrode and the first common electrode of the liquid crystal layer, and configured to apply a first electric field control signal for controlling the deflection angle of the liquid crystal, the control circuit is further electrically connected to the first display control electrode, the second display control electrode, the third display control electrode and the first common electrode of the color electrophoretic display pixel layer, and configured to provide a second electric field control signal for controlling each of the electrophoretic display pixel units of the color electrophoretic display pixel layer to display the color by mixing the colors of the three pixel sub-units, and the first common electrode is used in common by the color electrophoretic display pixel layer and the liquid crystal layer.

2. The display device according to claim 1, wherein, the liquid crystal layer comprises liquid crystal units arranged in an array, and the liquid crystal units are in one-to-one correspondence with the electrophoretic display pixel units; and each of the liquid crystal units comprises three liquid crystal sub-units, and each of the three liquid crystal sub-units is correspondingly disposed on one of the pixel sub-units, and configured to change a luminous flux of light emitted from the pixel sub-unit.

3. The display device according to claim 1, wherein, the first micro-cup carries a background color charged particle, a first color charged particle and an electrophoretic liquid, and an electrical property of the background color charged particle is opposite to an electrical property of the first color charged particle, the background color charged particle and the first color charged particle are respectively gathered to a top or a bottom of the first micro-cup under an action of a first electric field formed by the first display control electrode and the first common electrode;

the second micro-cup carries the background color charged particle, a second color charged particle and the electrophoretic liquid, and an electrical property of the second color charged particle is opposite to the electrical property of the background color charged particle, the background color charged particle and the second color charged particle are respectively gathered to a top or a bottom of the second micro-cup under an action of a second electric field formed by the second display control electrode and the first common electrode;

the third micro-cup carries the background color charged particle, a third color charged particle and the electrophoretic liquid, and an electrical property of the third color charged particle is opposite to the electrical property of the background color charged particle, the background color charged particle and the third color charged particle are respectively gathered to a top or a bottom of the third micro-cup under an action of a third electric field formed by the third display control electrode and the first common electrode.

4. The display device according to claim 3, wherein the first color is cyan, the second color is yellow, the third color is magenta, and the background color is white.

5. The display device according to claim 3, wherein the first color is red, the second color is green, the third color is blue, and the background color is black.

6. The display device according to claim 1, wherein the luminous flux of the light emitted from the color electrophoretic display pixel layer changed by the liquid crystal layer is divided into N levels, N is larger than or equal to 256.

7. A display method of a display device, wherein the display device comprises: a color electrophoretic display pixel layer and a liquid crystal layer, wherein, the color electrophoretic display pixel layer comprises electrophoretic display pixel units arranged in an array, each of the electrophoretic display pixel units comprises three pixel sub-units, and each of the electrophoretic display pixel units is configured to display a color by mixing colors of the three pixel sub-units;

the liquid crystal layer is disposed on a light-emitting surface of the color electrophoretic display pixel layer, to change a luminous flux of light emitted from the color electrophoretic display pixel layer by controlling a deflection angle of a liquid crystal in the liquid crystal layer;

wherein each of the electrophoretic display pixel units comprises a first pixel sub-unit, a second pixel sub-unit and a third pixel sub-unit; and the first pixel sub-unit is configured to display a first color or a background color, the second pixel sub-unit is configured to display a second color or the background color, and the third pixel sub-unit is configured to display a third color or the background color;

the first pixel sub-unit comprises a first micro-cup, a first display control electrode and a first common electrode; the second pixel sub-unit comprises a second micro-cup, a second display control electrode and the first common electrode; and the third pixel sub-unit comprises a third micro-cup, a third display control electrode and the first common electrode;

the display device further comprises a control circuit, wherein the control circuit is electrically connected to a first electrode and the first common electrode of the liquid crystal layer, and configured to apply a first electric field control signal for controlling the deflection angle of the liquid crystal, the control circuit is further electrically connected to the first display control electrode, the second display control electrode, the third display control electrode and the first common electrode of the color electrophoretic display pixel layer, and configured to provide a second electric field control signal for controlling each of the electrophoretic display pixel units of the color electrophoretic display pixel layer to display the color by mixing the colors of the three pixel sub-units, and the first common electrode is used in common by the color electrophoretic display pixel layer and the liquid crystal layer the display method comprises:

determining a first electric field control signal of the liquid crystal layer and a second electric field control signal of the color electrophoretic display pixel layer according to a display pattern;

controlling a deflection angle of a liquid crystal in the liquid crystal layer in response to the first electric field control signal to change a luminous flux of light emitted from the color electrophoretic display pixel layer; and controlling each of the electrophoretic display pixel units of the color electrophoretic display pixel layer to display a color by mixing colors of three pixel sub-units of each of the electrophoretic display pixel units in response to the second electric field control signal.

8. The display method according to claim 7, wherein, the liquid crystal layer comprises liquid crystal units arranged in an array, and the liquid crystal units are in one-to-one correspondence with the electrophoretic display pixel units; and each of the liquid crystal units comprises three liquid crystal sub-units, and each of the three liquid crystal sub-units is correspondingly disposed on one of the pixel sub-units;

the controlling the deflection angle of the liquid crystal in the liquid crystal layer in response to the first electric field control signal to change the luminous flux of light emitted from the color electrophoretic display pixel layer comprises:

controlling an electric field of each of the three liquid crystal sub-units in response to the first electric field control signal to change a luminous flux of light emitted from the pixel sub-unit corresponding to the liquid crystal sub-unit.

9. The display method according to claim 7, wherein, the first micro-cup carries a background color charged particle, a first color charged particle and an electrophoretic liquid, and an electrical property of the background color charged particle is opposite to an electrical property of the first color charged particle;

the second micro-cup carries the background color charged particle, a second color charged particle and the electrophoretic liquid, and an electrical property of the second color charged particle is opposite to the electrical property of the background color charged particle; and the third micro-cup carries the background color charged particle, a third color charged particle and the electrophoretic liquid, and an electrical property of the third color charged particle is opposite to the electrical property of the background color charged particle.

10. The display method according to claim 9, wherein the controlling each of electrophoretic display pixel units of the color electrophoretic display pixel layer to display the color by mixing the colors of three pixel sub-units of each of the electrophoretic display pixel units in response to the second electric field control signal comprises:

controlling a direction of a first electric field corresponding to the first pixel sub-unit to enable the first pixel sub-unit to display the background color in response to that the background color charged particle is gathered to a top of the first micro-cup and the first color charged particle is gathered to a bottom of the first micro-cup when the first electric field is in a first direction; and to enable the first pixel sub-unit to display the first color in response to that the background color charged particle is gathered to the bottom of the first micro-cup and the first color charged particle is gathered to the top of the first micro-cup when the first electric field is in a second direction; the first direction is opposite to the second direction;

controlling a direction of a second electric field corresponding to the second pixel sub-unit to enable the second pixel sub-unit to display the background color in response to that the background color charged particle is gathered to a top of the second micro-cup and the second color charged particle is gathered to a bottom of the second micro-cup when the second electric field is in the first direction; and to enable the second pixel sub-unit to display the second color in response to that the background color charged particle is gathered to the bottom of the second micro-cup and the second color charged particle is gathered to the top of the second micro-cup when the second electric field is in the second direction; the first direction is opposite to the second direction; and controlling a direction of a third electric field corresponding to the third pixel sub-unit to enable the third pixel sub-unit to display the background color in response to that the background color charged particle is gathered to a top of the third micro-cup and the third color charged particle is gathered to a bottom of the third micro-cup when the third electric field is in the first direction; and to enable the third pixel sub-unit to display the third color in response to that the background color charged particle is gathered to the bottom of the third micro-cup and the third color charged particle is gathered to the top of the third micro-cup when the third electric field is in the second direction; the first direction is opposite to the second direction.

11. The display method according to claim 10, wherein the first color is cyan, the second color is yellow, the third color is magenta, and the background color is white.

12. The display method according to claim 10, wherein the first color is red, the second color is green, the third color is blue, and the background color is black.

* * * * *